United States Patent
Rajan (10) Patent No.: US 12,368,319 B2
(45) Date of Patent: Jul. 22, 2025

(54) RENEWABLE ENERGY AND BACKUP POWER DISTRIBUTION AND RESOURCE MANAGEMENT SYSTEM

(71) Applicant: Rahul Rajan, Pune (IN)

(72) Inventor: Rahul Rajan, Pune (IN)

(*) Notice: Subject to any disclaimer, the term of this patent is extended or adjusted under 35 U.S.C. 154(b) by 0 days.

(21) Appl. No.: 18/661,120

(22) Filed: May 10, 2024

(65) Prior Publication Data

US 2024/0388130 A1 Nov. 21, 2024

(51) Int. Cl.
*H02J 13/00* (2006.01)
*B60L 53/68* (2019.01)
*H02J 3/00* (2006.01)
*H02J 3/38* (2006.01)

(52) U.S. Cl.
CPC ........ *H02J 13/00026* (2020.01); *B60L 53/68* (2019.02); *H02J 3/0073* (2020.01); *H02J 3/0075* (2020.01); *H02J 3/38* (2013.01); *H02J 13/00002* (2020.01); *H02J 2300/24* (2020.01); *H02J 2300/28* (2020.01); *H02J 2310/12* (2020.01)

(58) Field of Classification Search
CPC .... H02J 13/00; H02J 13/00026; H02J 3/0073; H02J 13/00002; H02J 3/00; H02J 3/0075; H02J 3/38; H02J 2300/28; H02J 2300/24; H02J 2310/12; B60L 53/68
See application file for complete search history.

(56) References Cited

U.S. PATENT DOCUMENTS

2024/0047991 A1* 2/2024 Caamano ................ H02J 7/007

* cited by examiner

*Primary Examiner* — Robert L Deberadinis
(74) *Attorney, Agent, or Firm* — Preston Smirman; SMIRMAN IP LAW, PLLC (57) ABSTRACT

Renewable energy and backup power distribution and resource management systems wherein each individual unit of a property has an electrical device (100) for power source selection and plurality of the devices (100 *a-n*) are controlled and monitored by a central controlling device (300). A master box (400) incorporates the functionality of plurality of electrical devices. The device (100) has grid mains (10), renewable power source (20) and backup power source (30) as power sources and the property unit output (200) and the EV charging output (201) as power outputs. The device (100) comprises of monitoring and control unit (102), switching means (106, 107) and communication ports (109). The device (100) functions as an automatic changeover with current or power limiter that supplies power to the property output (200) as per the pre-determined threshold. The central controlling device controls and monitors various equipments in a property through wired or wireless connections.

20 Claims, 6 Drawing Sheets

RENEWABLE ENERGY AND BACKUP POWER DISTRIBUTION AND RESOURCE MANAGEMENT SYSTEM

CROSS-REFERENCE TO RELATED APPLICATION

The instant application claims priority to Indian Patent Application Serial No. 202321033946, filed May 15, 2023, the entire specification of which is expressly incorporated herein by reference.

FIELD OF THE INVENTION

The present invention generally relates to the field of efficient renewable energy distribution and a backup power supply as a part of an enhanced property management system. More specifically, the present invention relates to an optimized and efficient renewable energy and backup power distribution system for individual units and individual EV chargers in a multi-tenement building which is part of a resource management focused property management system that includes an electrical device for individual property units and a common controlling device for the entire property which has the capability to monitor and control equipment/loads as per energy demand, supply and availability.

BACKGROUND OF THE INVENTION

Buildings account for a majority of the carbon emissions in the planet as most of these built-spaces were not designed with efficiency in mind, such as air tightness, ventilation, shade, insulation, water efficient fixtures, etc. This has led to increased energy consumption and carbon emissions for running equipment for heating and cooling loads, lighting, water pumps, etc. that further contributes to climate change.

In a typical building that has a non-functional empty roof space, the roof is exposed to direct sunlight leading to massive heat gain for the entire building, leading to more cooling using inefficient air-conditioners, that further generates more carbon emissions, which leads to more severe heat events that leads to more energy being used for air-conditioning, resulting in a catastrophic negative feedback loop.

Renewable energy systems like rooftop solar PV systems can help reduce or possible negate the negative feedback loop if enough capacity is installed on the roof of the building to cover the areas that are exposed to sunlight.

If solar PV panels are installed to cover the entire roof, sunlight will barely irradiate on the roof floor, which prevents the roof slab to act as a thermal battery and this further prevents the building and its occupants from heat gain. Incidentally, this reduces the power required to cool the building/apartments, further diminishing the power cost and carbon emissions for the end users, achieving passive cooling for the building.

Presently, in a multi-tenant residential or commercial building, the renewable energy systems installed in the property usually only satisfy the common loads of the building, which requires limited roof space of the total available/usable area. If individual tenants would like to opt for a renewable energy connection in their apartment/office, they will each have to purchase a separate solar inverter, DC and AC cables, AC and DC distribution boxes, fuses, a generation meter, a set of earthing pits, a net-meter and its sanctions, AC armored cables, etc. The overall cost and complexity of the system increases exponentially which in turn, dissuades potential clients from installing additional renewable energy systems on an individual capacity that would help in combating the serious issue of climate change. This results in space on the roof that is not covered with solar PV panels, hence reducing the renewable energy generation potential of these buildings.

Another challenge that individual units' occupants in multi-tenement buildings face is the lack of access to individual EV charging points. Even if some of the occupants have their individual EV charging points, they are almost never powered by renewable energy. Hence, the lack of access to fairly distributed renewable energy for charging EVs in a multi-tenement building on an individual basis is lacking.

OBJECTS OF THE INVENTION

It is an object of the present invention to ameliorate one or more problems of the prior art or to at least provide a useful alternative.

An object of the present invention is to provide an efficient renewable energy distribution and a backup power supply system as a part of an enhanced property management system.

An object of the invention is to provide an optimized and efficient renewable energy and backup power distribution system for individual units and individual EV chargers in a multi-tenement building which is part of a resource management focused property management system that includes an electrical device for individual property units and a common controlling device for the entire property which has the capability to monitor and control building equipment/loads as per energy demand, supply and availability.

Another object of the present invention is to provide a system that enables distribution of power from multiple power sources through a common distribution point.

Still another object of the present invention is to provide a system that facilitates distribution of a pre-determined amount of renewable energy (power) to each user.

Still another object of the present invention is to provide a system that facilitates switching between multiple sources of energy based on a pre-determined logic.

Yet another object of the present invention is to provide a system that optimizes on efficient utilization of various resources by control and management of its distribution.

Still another object of the present invention is to provide an energy optimization system for the entire property for example the entire residential building, residential complex, industrial complex, malls, etc. by monitoring and controlling the common building property and for each individual unit in this property is for example individual apartments in a residential building, individual houses in a residential society, shops in a larger mall, etc.

Yet another object of the present invention is to provide a system to allow individual units in a property to receive power from a common backup power source (battery storage, diesel generators, etc.) with a current/power limiting logic without requiring additional wiring from the electrical device to the individual unit.

Still another object of the present invention is to provide the capability of the occupant to charge their EV at their individual charging point using renewable energy, based on available renewable energy load capacity.

Yet another object of the present invention is to provide a master box having the functionality of a plurality of the electrical devices that has cost benefits due to lower number of components used, less wiring and labor; improvement in speed due to the plug and play feature and quick mounting feature; as well as improvement in space required, when compared to installations of individual electrical devices.

SUMMARY OF THE INVENTION

The present invention describes a renewable energy and backup power distribution and resource management system for property management system. In the present invention, each individual unit of a property has an electrical device for power source selection and a plurality of such electrical devices are controlled and monitored by a unitary Central Controlling Device (CCD) and a master box incorporates the functionality of the plurality of electrical devices.

According to an aspect of the present invention, the electrical device has three sources of power input including grid mains, renewable power source and backup power source and two power outputs including the property unit output and the EV charging output. The device further comprises of a monitoring and control unit, switching means for individual property load, switching means for EV charging load and communication port.

According to another aspect of the present invention, the electrical device functions as an automatic changeover with current or power limiter that supplies power to the property output as per the pre-determined limit/threshold of current (amps) or power (KW). The electrical device also has a renewable Power Threshold (PT) setting in the monitor and control unit which sets the upper limit of the total power (KW) that can be drawn from the renewable power source by its total connected load-property unit output and EV charging output at a given time.

According to another aspect of the present invention, the Central Controlling Device (CCD) additionally controls and monitors equipments used in a property including water/flow meters, actuators, solenoid valves, motion sensors and lighting equipment such as heat pumps and boilers, elevators and escalators, air conditioning, water pumps, sewage treatment plants, Battery Storage (lead acid, lithium ion) and diesel generators through wired or wireless connections.

According to another aspect of the present invention, the master box is a wall hung/floor mounted device that can function as up to 30 electrical devices, it incorporates the incoming supply of DG/battery/alternative source of power for the Backup Power source functionality, and has the in-built Central Controlling Device (CCD) which connects to the internet/local computer via WIFI, Ethernet or Bluetooth through which the master box can be monitored and controlled for data collection, change of settings (such as logic and parameter settings for each connection, main system settings, etc.), live monitoring of the health and performance of the system and the entire building.

BRIEF DESCRIPTION OF THE DRAWINGS

The present invention, together with further objects and advantages thereof, is more particularly described in conjunction with the accompanying drawings in which.

DETAILED DESCRIPTION OF THE INVENTION

The embodiments herein below and the various features and advantageous details thereof are explained with reference to the non-limiting embodiments in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification, the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of files, acts, materials, devices, articles or the like that has been included in this specification is solely for providing a context for the disclosure. It is not to be taken as an admission that any or all of these matters form a part of the prior art base or were common general knowledge in the field relevant to the disclosure as it existed anywhere before the priority date of this application.

The present invention describes a renewable energy and backup power distribution and resource management system that is a highly advanced and efficient resource focused building management system. This system optimizes on efficient utilization of various resources by control and management of its distribution. The building management system is for the entire property for example the entire residential building, residential complex, industrial complex, malls, etc. and also for each individual unit in this property for example individual apartments in a residential building, individual houses in a residential society, shops in a larger mall, etc. In the present invention, each individual unit of a property has installation of an electrical device. The electrical device (100) is an electrical device for power source selection. A plurality of such devices (100 *a-n*) is controlled and monitored by a unitary Central Controlling Device (CCD) which functions as the brain of the entire building management system. The Central Controlling Device (CCD) monitors, controls and manages various resources used in a property such as energy parameters, time limits, quantity of resource used (electricity/water), temperature of air and water, water levels, generation of power, etc.

Figure 1:
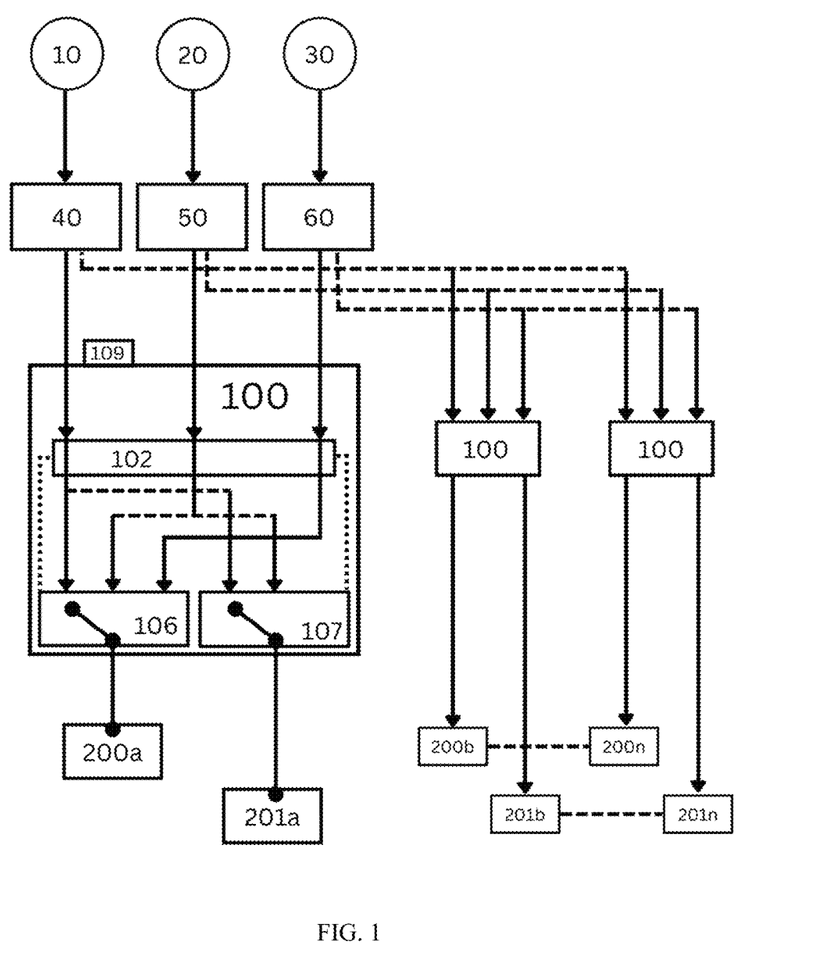
FIG. 1 illustrates a block diagram depicting the system including the device, in accordance with an embodiment of present invention.

In the preferred embodiment of the present invention, referring to FIG. 1, the device (100) in an individual unit of a property is connected to multiple power sources. The device (100) has three sources of power input-Grid mains (10), renewable power source (20) and backup power source (30) through the individual unit power supply (from power distribution company meter) (40), renewable power supply busbar/junction box (50) and backup power supply busbar/junction box (60) respectively. The device (100) has two power outputs. The output to property (200) is either a single or plurality of loads that are selected from residential (apartments, houses), commercial (offices/shops), or an industrial load (factories, manufacturing units). The other output source is output to the EV charging point for that individual unit (201).

In the preferred embodiment of the present invention, one type of the power inputs for the device (100) is the renewable power source (20). The renewable power source (20) is at least one selected from solar power, wind power, and hydro power. The renewable power source is most likely to be generated from a rooftop solar plant. Accordingly, the renewable power source (20) can comprise of one or a combination of solar panels, a wind turbine generator, and a hydro generator depending of the type of the renewable energy source. The alternative power source (20) further comprises one or more converters, rectifiers, and inverters to facilitate generation of adequate power.

In the preferred embodiment of the present invention, another type of power input for the device (100) is the backup power source (30). The backup power source (30) is at least one or a combination of options selected from a battery bank or diesel generator that will turn on automatically or manually when grid mains power (10) fails or is disconnected. The backup power source (30) input also allows the device (100) to function as an automatic changeover with current or power limiter which supplies power to the property output (200)—apartment/office/shop/industrial unit as per the pre-determined limit/threshold of current (amps) or power (kW). For example, if the current threshold is crossed by the individual apartment/shop/office/industrial load (property load), the system (100) will cut off the power supply of that property unit for a fixed interval of time, then turn on the backup power source again to check the load. This cycle will continue for three times and if it fails all the three times, the system (100) will shut off the backup power source (30) of that unit for that particular event.

In the preferred embodiment of the present invention, the device (100) functions as an automatic changeover with current/power limiter in the following manner for different setups:

a. When the backup power source (30) is a diesel generator, the generator will turn on when the grid mains power (10) fails and renewable power source (20) will automatically shut down when it's a grid tied system;

b. When the renewable power source (20) for example, the solar power source is a hybrid system i.e., connected to the grid mains and to a battery bank, then the solar-battery hybrid system will power the property load (200) through the backup power source input (30) of the device (100);

c. When the battery bank is not part of the renewable power source (20) that is not a hybrid system, then the battery bank will power the property load (200) through the backup power source input (30) of the device (100); and d. When no backup power source input (30) is connected to the device (100), there will be no power supply when the grid (10) fails.

In the preferred embodiment of the present invention, as illustrated in FIG. 1, the device (100) comprises of a monitoring and control unit (102), switching means for individual property load (106), switching means for EV charging load (107) and communication port (109). The monitoring unit and control unit (102) is configured to monitor and control various parameters associated with the power received from the power sources (10, 20 and 30). The parameters include, but are not limited to, voltage, current, power, and energy consumption of the loads (200 and 201). Accordingly, the monitoring and control unit (102) includes current transformers (CTs), potential transformers (PTs), and measuring devices such as voltmeter, ammeter, energy meter, and the like. The switching means for individual property load (106) switches on or off the supply of all three power sources to the property unit output (200) and the switching means for EV charging load (107) switches on or off the supply of two power sources (grid (10) and renewable (20)) to the EV charging output (201). The switching means (106) is selected from the group consisting of a contactor, a relay, a circuit breaker, and the like.

In the preferred embodiment of the present invention, the device (100) has a renewable Power Threshold (PT) setting in the monitor and control unit (102) which sets the upper limit of the total power (kW) that can be drawn from the renewable power source (20) by its total connected load property unit output (200) and EV charging output (201) at a given time. When the power demand by the both loads i.e., property unit output (200) and EV charging output (201) is greater than the renewable Power Threshold (PT) of the device (100), then the source of power for EV charging output (201) will switch from renewable power source (20) to grid mains power (10) to maintain the power threshold. When the property unit output (200) is still greater than the power threshold after disconnection of EV charging output (201) from renewable power source (20), then even property unit output (200) will switch to grid mains power (10). Once the monitoring and control unit (102) detects that the power demand by the load has dropped below the renewable Power Threshold (PT), and if the device (100) has balance units for renewable power, the source of power for both property unit output (200) and EV charging output (201) will switch back to renewable power source (20).

In the preferred embodiment of the present invention, the device (100) has two output options. The first output is the output to property (200) that is either a single or plurality of loads that are selected from residential (apartments, houses), commercial (offices/shops), or an industrial load (factories, manufacturing units). The other output source is output to the EV (electric vehicle) charging point for that property unit (201). The EV charging output (201) output supplies power to the EV (electric vehicle) charging point for that particular individual property unit. In the default mode in the device (100), when balance renewable/solar units are available in the device, both power outputs will be supplied by the renewable power source (20). The power demand here will be the summation of both output's load requirements i.e., property unit output (200) and the EV Charging output (201). The balance renewable/solar renewable energy units in the device (100) are the remaining renewable power source units not used by the property. As described earlier, the renewable Power Threshold (PT) setting of the device (100) sets the upper limit of the total power (KW) that can be drawn from the renewable power source (20) by its connected load at a given time. The source of power for the EV Charging output (201) is decided by the device (100) based upon the following criteria:

a. If balance renewable/solar units is less than or equal to 0 and the sum of property unit output (200) plus EV Charging output (201) is less than the power threshold, then both, property unit output (200) and EV Charging output (201), will be powered by the Grid mains power (10);

b. If balance renewable/solar units are greater than 0 and the sum of property unit output (200) plus EV Charging output (201) is less than the power threshold, then both, property unit output (200) and EV Charging output (201), will be powered by renewable power source (20) or solar power source (20);

c. If balance renewable/solar units is greater than 0 and the sum of property unit output (200) plus EV Charging output (201) is greater than power threshold, however individually, the property unit output (200) and the EV Charging output (201) are less than power threshold, then the property unit output (200) will be powered by renewable power source (20) or solar power source (20) and the EV Charging output (201) will be powered by the grid mains power (10). In this scenario, priority of the renewable power source (20) is for the property unit output (200);

d. If balance renewable/solar units is greater than 0 and the sum of property unit output (200) plus EV Charging output (201) is greater than power threshold, however individually, the property unit output (200) is greater than power threshold but the EV Charging output (201) is less than power threshold, then the property unit output (200) will be powered by grid mains power (10) and the EV Charging output (201) will be powered by the renewable power source (20) or solar power source (20); and e. If balance renewable/solar units is greater than 0 and the sum of property unit output (200) plus EV Charging output (201) is greater than power threshold, as well as individually the loads are greater than the power threshold, then both, the property unit output (200) and EV Charging output (201) will be powered by grid mains power (10). Further, in the present invention, if the property unit output (200) plus EV Charging output (201) drops below power threshold in cases of reduced power consumption, then the device (100) will switch the power source back to renewable power source (20) or solar power source (20) if balance renewable/solar units are available.

In certain scenarios when there is power outage, meaning no power supply from the Grid mains power (10), the system will switch to the alternate power sources, i.e., backup power source (30) depending on the availability of this power supply. In this scenario, EV charging is stopped and the supply of the alternate power source will only satisfy the apartment load.

In the preferred embodiment of the present invention, the monitoring and control unit (102) of the device (100) comprises a memory and a processor. The memory is configured to store a pre-determined limit of energy consumption value for the loads and a set of instructions based on pre-defined conditions/logic. Alternatively, the memory may be configured to receive a dynamic limit of energy consumption value for the loads and a new set of instructions based on calculated conditions/logic from the central controlling device. The processor is configured to receive the monitored parameter values, and is further configured to execute the set of instructions stored in the memory or from the central controlling device to generate an actuating signal for controlling the switching means (106, 107) based on the monitored parameter values and the pre-determined logic. The processor may be a general-purpose processor, a Field Programmable Gate Array (FPGA), an Application Specific Integrated Circuit (ASIC), a Digital Signal Processor (DSP), a Central Processing Unit (CPU), and/or the like. The switching means (106, 107) are connected to the monitoring and control unit (102) and receive the actuating signal. Based on the received actuating signal, the switching means (106, 107) selects either of the available power sources (10, 20 or 30). Accordingly, property unit output (200) is being powered from either the grid mains power (10) or the renewable power source (20) or the backup power source (30), whereas the EV Charging output (201) is being powered by either grids main power (10) or renewable power (20). The device (100) includes an interface for facilitating the user or the central controlling device to set the pre-determined limit of energy consumption value.

In the preferred embodiment, the device (100) includes one or more communication port(s) (109) for facilitating integration with a battery management system (BMS), a data logger, a GSM (Global System for Mobile Communications) module, an Ethernet port, an RS485 port and a port for firmware updates. Accordingly, the device (100) facilitates remote control and indication of monitored parameters on the central controlling device. The device (100) is further configured by a cloud-based system/software through the central controlling device to send and receive data, update its pre-defined conditions/parameters, update its firmware, switch to a user-defined particular power source, etc. The device (100) also includes manual changeover switches for manual selection of power source.

In the embodiment of the present invention, a system is disclosed for optimizing power distribution from multiple sources including power grid, renewable energy sources and backup power sources to multiple users through a common distribution point. The multiple users are from facilities such as a building, a residential complex, or a common commercial complex. The system consists of a plurality of devices (100 (a-n)) and building equipments) that are connected to the central controlling device (300). Each device (100 a-n) is configured to facilitate selection of at least one power source from the multiple power sources based on a pre-defined logic to deliver a pre-defined amount of power to the associated user. The central controlling device is implemented as one or more microprocessors, microcontrollers, digital signal processors, central processing units, or any devices that manipulate signals based on defined instructions. The central controlling device is coupled to a plurality of devices (100 a-n) either remotely through wireless or by wired connections.

Figure 4:
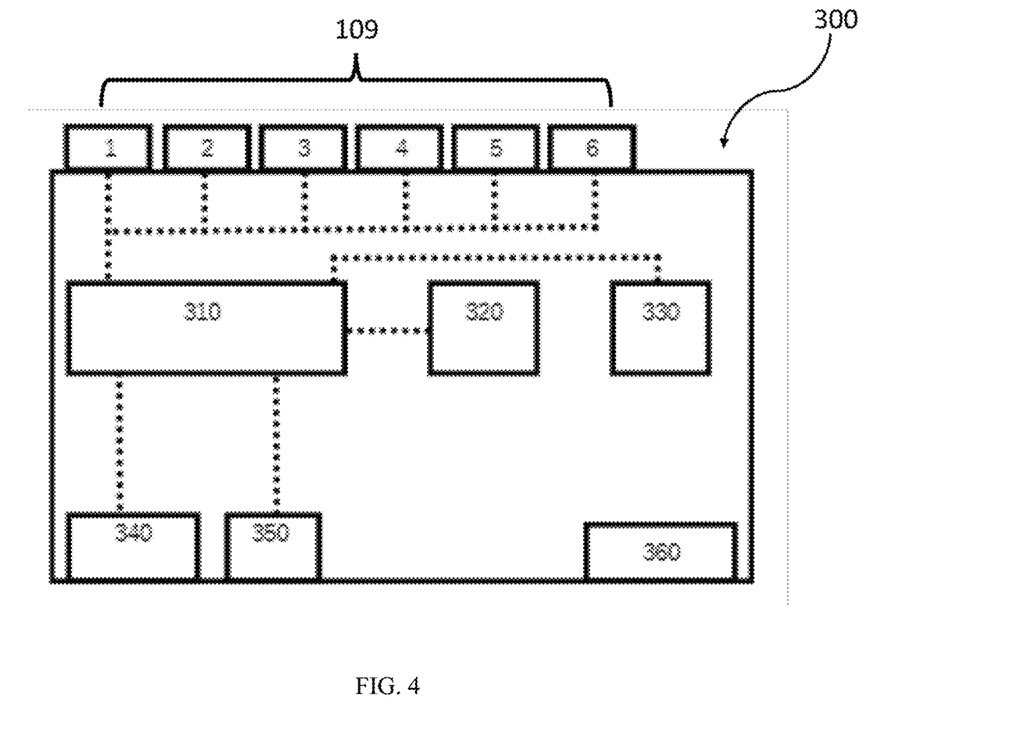
FIG. 4 illustrates a bock diagram depicting the assembly and connections in the central controlling device, in accordance with an embodiment of present invention.

As illustrated in FIG. 4, the central controlling device (300) comprises of 4-6 communication ports (109) preferably RS485 serial communication interface ports. A plurality of devices (100 (a-n)) and building equipments are connected to the central controlling device (300) under the same communication protocol (109). Additionally, the central controlling device (300) comprises of data processing, monitor and control unit (310), WIFI and Bluetooth connection (320), SIM card slot (330), Ethernet port (340), USB port (350) and power supply to the central controlling device (360).

In the preferred embodiment of the present invention, the central controlling device (CCD) additionally controls and monitors additional equipments usually used in a property like water/flow meters, actuators, solenoid valves, motion sensors and lighting equipment such as heat pumps and boilers, elevators and escalators, air conditioning, water pumps, sewage treatment plants, battery storage (lead acid, lithium ion), diesel generators, etc. The central controlling device (CCD) is connected to all these equipments through wired (RS485, Ethernet, serial port, etc.) or wireless connections (GSM, WIFI, Bluetooth). The monitoring and management of all these equipments by the central controlling device (CCD) increases overall functionality of the system and creates a highly advanced resource-focused building management system (BMS) which optimizes on efficient utilization of power and water consumption by control of its distribution.

In the preferred embodiment of the present invention, the involvement of water/flow meters that can relay data to the central controlling device allow the central controlling device to monitor the water usage of users of the system, and also control the water consumption by signaling the actuators/solenoid valves in the pipeline to open/close according to the set limits done on the cloud platform for the user. The lighting equipment and motion sensor incorporation to the system enables data collection of patterns, monitoring of energy usage and controlling capabilities for troubleshooting.

Further, energy intensive equipment such as heat pumps, boilers, air conditioning, water pumps, sewage treatment plants can be monitored for their current states, and then controlled based on the current energy generation from renewable sources. For example, if there is excess power generation during noon as compared to the total load of the building, the central controlling device can start the above mentioned equipment to consume this additional power, if their desired limit states (water temperature, air temperature, water level in overhead and underground storage tanks, sewage levels) are not currently satisfied. Conversely, if there is a drop in power generation from renewable sources, the central controlling device can turn off the above-mentioned equipment if their parameters of desired states are within the allowable range, to reduce the load on the alternate power sources. Escalators and elevators can be monitored for the energy consumption and their usage data for analysis and troubleshooting purposes and can be remotely controlled for emergencies.

In the given embodiment of the present invention, the primary objective of the system is to monitor and control the common energy intensive equipments as well as the electrical device (100) of individual property units within a large property such as building or a cluster of buildings to optimize energy consumption based on renewable energy generation. As the monitoring and controlling of these equipments creates a pattern over time with respect to energy generation from renewable and total building load trends, the central controlling device will be able to increase or decrease the limits of the devices (100) within the system based on excess power or deficient power respectively.

In the preferred embodiment of the present invention, the common power backup source (30) for the property units such as society/dwelling units/township, etc. can be either one or combination of battery bank, solar-hybrid system with a battery bank, diesel generator or any other power backup source that may be installed. Monitoring of the parameters of the power backup supply by the central controlling device is done based on the power backup source:

a. Battery Bank—battery level, voltage, amps, load (kW, kVA), balance kWh, errors and faults;
b. Solar hybrid system—current solar generation, battery level, voltage, amps, Load (kW, kVA), balance kWh, balance time of supply, errors and faults; and
c. Diesel Generator—fuel level, voltage, amps, load (kW, kVA), and balance time of supply, errors and faults.

The control of power backup supply/source includes turning on and turning off the source of power back up and changing the settings of parameter such as voltage, current limits, etc.

In the preferred embodiment of the present invention, the monitor and control of power backup supply input (30) on device is carried out by central controlling device that includes monitoring voltage, current (Amps), kW, kVA, total kWh consumed and control includes setting the current limit/power limit, turn on, turn off the input, battery/fuel level, etc. Central Controlling Device also monitors voltage, current (amps), kW, total kWh consumed and controls power limit (kW), energy limit (kWh), time limit, turn on, turn off of EV charging output on the device (100). Further as described earlier, the central controlling device monitors and controls the power source inputs for both outputs—property load and EV charging load. Monitoring the load of both outputs and then controlling the inputs based on situational and conditional factors which include forcing the device (100) to supply either grid power or solar power or power backup to the property unit or to the EV charging unit. The central controlling device also helps for setting the solar power threshold (PT) of the device (100).

Figure 2:
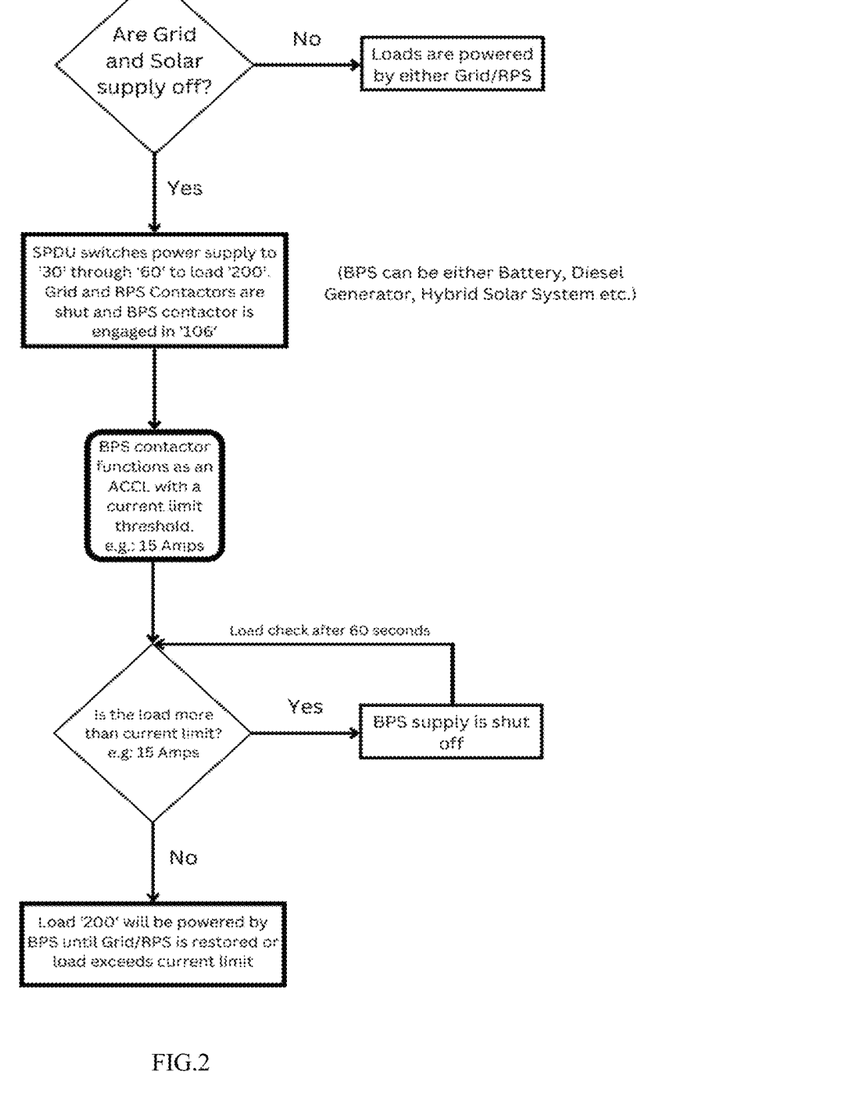
FIG. 2 illustrates a flow chart depicting operational logic of selecting the power source, in accordance with an embodiment of present invention.
Figure 3:
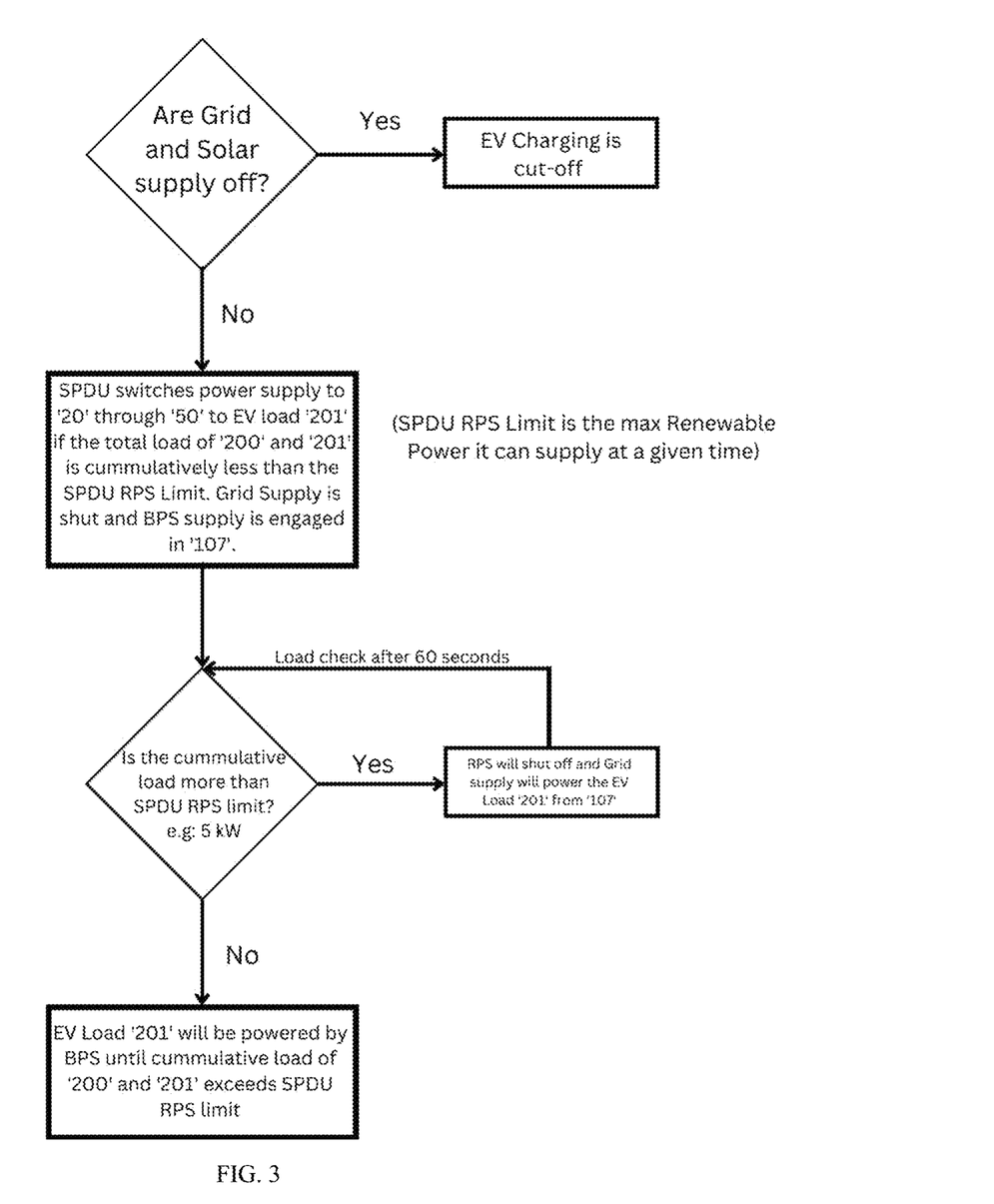
FIG. 3 illustrates a flow chart depicting operational logic of selecting the power source, in accordance with an embodiment of present invention.
Figure 5:
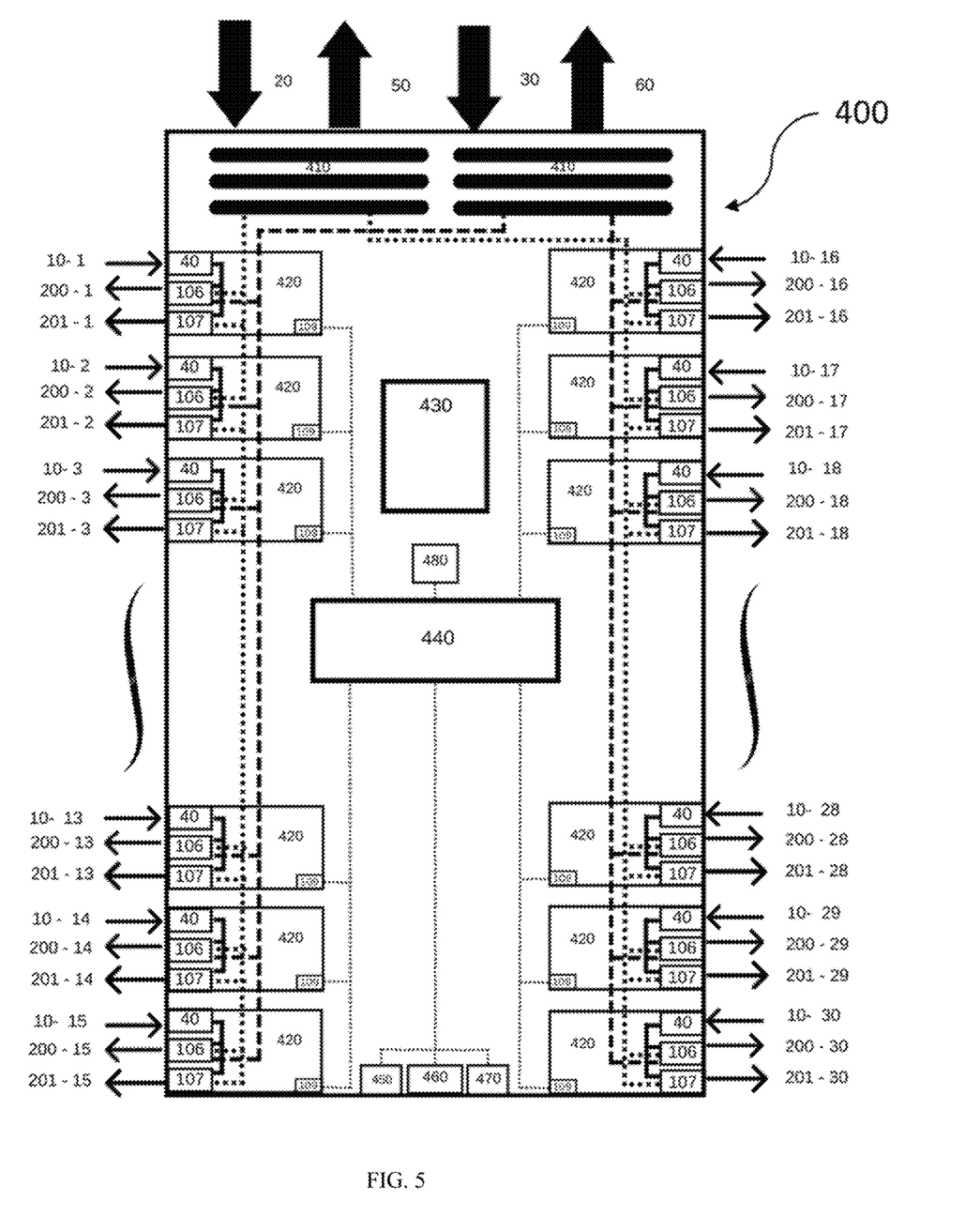
FIG. 5 illustrates a representation of the master box depicting the components, assembly and the connections, in accordance with an embodiment of present invention.

In a preferred embodiment of the present invention, as illustrated in FIG. 5, a wall hung/floor mounted device or master box (400) is provided that incorporates the functionality of multiple electrical devices (100 1-n) and at the same time, also provides power supply to the common loads of the entire property through one or more control boards that will have its own individual programming/logic based on the building requirements for the common load/building equipment. The master box can function as up to 30 electrical devices (100). The master box (400) also incorporates the incoming supply of DG/battery/alternative source of power for the backup power source (30) functionality. The master box has an in-built central controlling device (CCD) which connects to the internet/local computer via WIFI (480), Ethernet (460) or Bluetooth (480) through which the master box (400) can be monitored and controlled for data collection, change of settings (such as logic and parameter settings for each connection, main system settings, etc.), live monitoring of the health and performance of the system and the entire building. The operational logic as described in FIGS. 2 and 3 is carried out by the master box (400). The individual connections to individual units/common loads (100) are done via a control board (420) that incorporates a communication port (RS485 Serial Port) (109), one incoming power supply connection from power distribution company meter (40), and two outgoing ports that are unit load (106) and EV charger (107). The Common Loads can be connected to the unit load (106), through which the power supply is provided based on pre-defined programmable logic to allow renewable power supply and backup power supply to be supplied based on the building requirements. Individual building equipment is connected to each control board (420) or multiple/entire building equipment/common loads can be connected to a control board. A display screen (430) is present on the master box (400) that will allow users to view data, monitor the system and change settings, if permissions are granted, via a user interface. The master box (400) incorporates multiple safety components throughout the main PCB, input and output of busbars and the control boards. The master box (400) has cost benefits due to lower number of components used, less wiring and labor; improvement in speed due to the plug and play feature and quick mounting feature; increased reliability, safety and quality of connections; as well as improvement in space required, when compared to installations of individual electrical devices.

Figure 6:
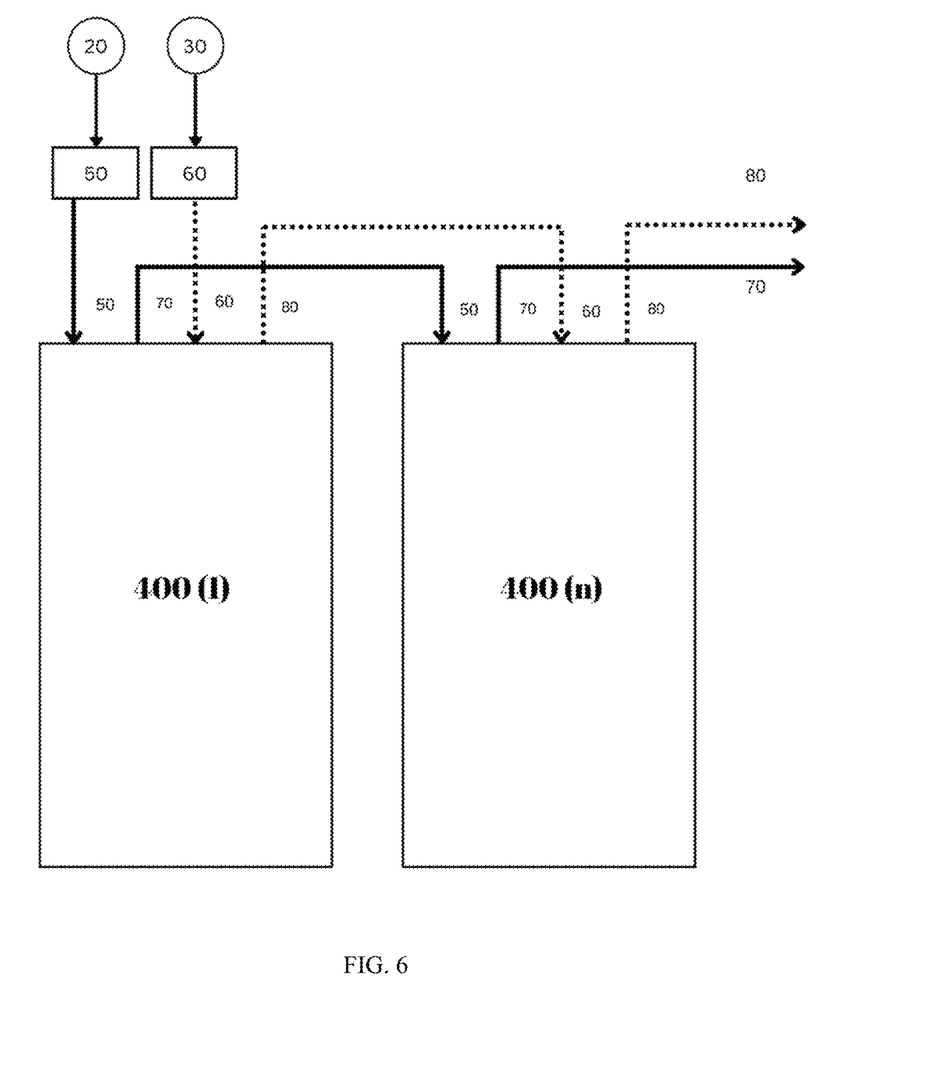
FIG. 6 illustrates the representation of the scalability of the master box, in accordance with an embodiment of present invention.

According to an embodiment of the invention, as illustrated in FIG. 6, if a building requires more than 30 connections, a series of master boxes (400 1-n) can be installed at the site where the incoming power cables for renewable power source (70) and backup power source (80) can be looped in a daisy chain manner, reducing the number and length of main cables throughout the property.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The disclosure has been described with reference to the accompanying embodiments which do not limit the scope and ambit of the disclosure. The description provided is purely by way of example and illustration. While considerable emphasis has been placed herein on the components and component parts of the preferred embodiments, it will be appreciated that many embodiments can be made and that many changes can be made in the preferred embodiments without departing from the principles of the disclosure.

LIST OF REFERENCE NUMERALS:

| Reference numeral | Name of the component |
| --- | --- |
| 100 | Electrical device |
| 10 | Grid mains |
| 20 | Renewable power source (RPS) |
| 30 | Backup Power source (BPS) |
| 40 | Individual unit power supply (from power distribution company meter) |
| 50 | RPS usbar/junction box |
| 60 | BPS Busbar/junction box |
| 70 | Renewable power supply line loop |
| 80 | Backup power supply line loop |
| 102 | Monitoring and control unit |
| 106 | Switching means for individual property load |
| 107 | Switching means for EV charging load |
| 109 | Communication port |
| 200 (a-n) | Output to property |
| 201 (a-n) | Output to EV charging point |
| 300 | Central controlling device (CCD) |
| 310 | Data processing, monitor and control unit of the Central controlling device |
| 320 | WIFI and Bluetooth slot |
| 330 | SIM card slot |
| 340 | Ethernet port |
| 350 | USB port |
| 360 | Power supply to the Central controlling device. |
| 400 | Master box |
| 410 | Internal RPS busbar of the master box |
| 420 | Control board of each electrical device (100) |
| 430 | Display and user interface |
| 440 | Data processing, monitor and control unit of the master box |
| 450 | USB port |
| 460 | Ethernet port |
| 470 | SIM card slot |
| 480 | WIFI and Bluetooth connection |

What is claimed is:

1. A renewable energy and backup power distribution and resource management system for property management system, characterised in that:
    each individual unit of a property has an electrical device for power source selection;
    a plurality of the electrical devices are controlled and monitored by a unitary central controlling device and a master box incorporates the functionality of the plurality of electrical devices and also provides power supply to the common loads of the entire property through control boards that will have its own individual programming or logic based on the building requirements for the common load or building equipment;
    wherein the electrical device has three sources of power input including grid mains, renewable power source and backup power source and two power outputs including the property unit output and the EV charging output;
    wherein the device comprises a monitoring and control unit, switching means for individual property load, switching means for EV charging load and communication port;
    wherein the electrical device functions as an automatic changeover with current or power limiter that supplies power to the property output as per the pre-determined limit or threshold of current (amps) or power (kW);
    wherein the electrical device has a renewable power threshold (PT) setting in the monitor and control unit which sets the upper limit of the total power (KW) that can be drawn from the renewable power source by its total connected load-property unit output and EV charging output at a given time;
    wherein the central controlling device (CCD) additionally controls and monitors equipments used in a property including water or flow meters, actuators, solenoid valves, motion sensors and lighting equipment such as heat pumps and boilers, elevators and escalators, air conditioning, water pumps, sewage treatment plants, battery storage and diesel generators through wired or wireless connections.

2. The system as claimed in claim 1, wherein the property management system is for the entire property including the entire residential building, residential complex, industrial complex, and malls and also for each individual unit in this property including individual apartments in a residential building, individual houses in a residential society, and shops in a larger mall.

3. The system as claimed in claim 1, wherein the renewable power source is at least one selected from solar power including rooftop solar plant, wind power, and hydro power or a combination of solar panels, a wind turbine generator, and a hydro generator depending of the type of the renewable energy source.

4. The system as claimed in claim 1, wherein the backup power source is at least one or a combination of options selected from a battery bank or diesel generator that will turn on automatically or manually when grid mains power fails or is disconnected.

5. The system as claimed in claim 1, wherein the output to property is either a single or plurality of loads that are selected from residential, commercial, or an industrial load and the EV charging point output supplies power to the EV (Electric Vehicle) charging point for that particular individual property unit.

6. The system as claimed in claim 1, wherein the device functions as an automatic changeover with current or power limiter in the following manner for different setups:
when the backup power source is a diesel generator, the generator will turn on when the grid mains power fails and renewable power source will automatically shut down when it's a grid tied system;
when the renewable power source is a solar power source is a hybrid system and is connected to the grid mains and to a battery bank, then the solar-battery hybrid system will power the property load through the backup power source input of the device;
when the battery bank is not part of the renewable power source, that is not a hybrid system, then the battery bank will power the property load through the backup power source input of the device; and
when no backup power source input is connected to the device, there will be no power supply when the grid power fails.

7. The system as claimed in claim 1, wherein the monitoring unit and control unit of the electrical device is configured to monitor and control various parameters associated with the power received from the power sources including voltage, current, power, and energy consumption of the loads and accordingly, the monitoring and control unit includes current transformers (CTs), potential transformers (PTs), and measuring devices such as voltmeters, ammeters, and energy meters.

8. The system as claimed in claim 1, wherein the switching means for individual property load switches on or off the supply of all three power sources to the property unit output and the switching means for EV charging load switches on or off the supply of two power sources to the EV charging output and the switching means is selected from the group consisting of a contactor, a relay, and a circuit breaker.

9. The system as claimed in claim 1, wherein when the power demand by the property unit output and EV charging output is greater than the renewable power threshold (PT) of the device, then the source of power for EV charging output will switch from renewable power source to grid mains power to maintain the power threshold and when the property unit output is still greater than the renewable power threshold (PT) after disconnection of EV charging output from renewable power source, then even property unit output will switch to grid mains power and when the monitoring and control unit detects that the power demand by the loads has dropped below the renewable power threshold (PT), and if the device has balance units for renewable power, the source of power for both property unit output and EV charging output will switch back to renewable power source.

10. The system as claimed in claim 1, wherein the source of power for the EV charging load is decided by the device based upon the following criteria:
if balance renewable or solar units is less than or equal to 0 and the sum of property unit output plus EV Charging output is less than the power threshold, then both, property unit output and EV charging output, will be powered by the grid mains power;
if balance renewable or solar units is greater than 0 and the sum of property unit output plus EV Charging output is less than the power threshold, then both, property unit output and EV charging output, will be powered by renewable power source or solar power source;
if balance renewable or solar units is greater than 0 and the sum of property unit output plus EV charging output is greater than power threshold, however individually, the property unit output and the EV Charging output are less than power threshold, then the property unit output will be powered by renewable power source or solar power source and the EV Charging output will be powered by the grid mains power and priority of the renewable power source is for the property unit output;
if balance renewable or solar units is greater than 0 and the sum of property unit output plus EV charging output is greater than power threshold, however individually, the property unit output is greater than power threshold but the EV charging output is less than power threshold, then the property unit output will be powered by grid mains power and the EV charging output will be powered by the renewable power source or solar power source; and
if balance renewable or solar units is greater than 0 and the sum of property unit output plus EV charging output is greater than power threshold, as well as individually the loads are greater than the power threshold, then both, the property unit output and EV charging output will be powered by grid mains power and if the property unit output plus EV charging output drops below power threshold in cases of reduced power consumption, then the device will switch the power source back to renewable power source or solar power source if balance renewable or solar units are available.

11. The system as claimed in claim 1, wherein the monitoring and control unit of the electrical device comprises a memory that is configured to store a pre-determined limit of energy consumption value for the loads and a set of instructions based on pre-defined conditions or logic and to receive a dynamic limit of energy consumption value for the loads and a new set of instructions based on calculated conditions or logic from the central controlling device and a processor that is configured to receive the monitored parameter values, and is further configured to execute the set of instructions stored in the memory or from the central controlling device to generate an actuating signal for controlling the switching means based on the monitored parameter values and the pre-determined logic.

12. The system as claimed in claim 1, wherein the switching means are connected to the monitoring and control unit of the electrical device and receive the actuating signal and based on the received signals, the switching means selects either of the available power sources and accordingly, property unit output is being powered from either the grid mains power or the renewable power source or the backup power source, whereas the EV charging output is being powered by either grids main power or renewable power and the device includes an interface for facilitating the user or the central controlling device to set the pre-determined limit of energy consumption value.

13. The system as claimed in claim 1, wherein the electrical device includes one or more communication ports for facilitating integration with a battery management system (BMS), a data logger, a GSM (Global System for Mobile Communications) module, an Ethernet port, an RS485 port and a port for firmware updates and the device facilitates remote control and indication of monitored parameters on the central controlling device.

14. The system as claimed in claim 1, wherein the electrical device is further configured by a cloud-based system through the central controlling device to send and receive data, update its pre-defined conditions or parameters, update its firmware, switch to a user-defined particular power source and the device also includes manual change-over switches for manual selection of power source.

15. The system as claimed in claim 1, wherein the system monitors and controls the common energy intensive equipments as well as the electrical device of individual property units within a large property such as building or a cluster of buildings to optimize energy consumption based on renewable energy generation and as the monitoring and controlling of these equipments creates a pattern over time with respect to energy generation from renewable and total building load trends, the central controlling device can increase or decrease the limits of the devices within the system based on excess power or deficient power respectively.

16. The system as claimed in claim 1, wherein the common power backup source for the property units such as society or dwelling units or township can be either one or combination of a battery bank, solar-hybrid system with a battery bank, diesel generator or any other power backup source that may be installed and monitoring of the parameters of the power backup supply by the central controlling device is done based on the power backup source:

wherein the parameters for the battery bank include battery level, voltage, amps, load (kW, kVA), balance kWh, errors and faults;

wherein the parameters for the solar hybrid system include current solar generation, battery level, voltage, amps, load (kW, kVA), balance kWh, balance time of supply, errors and faults;

wherein the parameters for the diesel generator include fuel level, voltage, amps, load (kW, kVA), balance time of supply, errors and faults.

17. The system as claimed in claim 1, wherein the central controlling device comprises 4-6 communication ports preferably RS485 serial communication interface ports and a plurality of the devices and building equipments are connected to the central controlling device under the same communication protocol and the central controlling device comprises of data processing, monitor and control unit, WIFI and Bluetooth connection, SIM card slot, Ethernet port, USB port and power supply to the central controlling device.

18. The system as claimed in claim 1, wherein the master box is a wall hung or floor mounted device that can function as up to 30 electrical devices, it incorporates the incoming supply of DG or battery or alternative source of power for the backup power source functionality, and has the in-built central controlling device (CCD) which connects to the internet or local computer via WIFI, Ethernet or Bluetooth through which the master box can be monitored and controlled for data collection, change of settings, live monitoring of the health and performance of the system and the entire building.

19. The system as claimed in claim 1, wherein in the master box, the individual connections to individual units or common loads are done via a control board that incorporates a communication port (RS485 Serial Port), one incoming power supply connection from power distribution company meter, and two outgoing ports that are unit load and EV Charger and the common loads are connected to the unit load, through which the power supply is provided based on pre-defined programmable logic to allow renewable power supply and backup power supply to be supplied based on the building requirements.

20. The system as claimed in claim 1, wherein individual building equipment can be connected to each control board or multiple or entire building equipment or common loads can be connected to a control board and the master box also includes a display screen that will allow users to view data, monitor the system and change settings, if permissions are granted, via a user interface and it also incorporates multiple safety components throughout the main PCB, input and output of busbars and the control boards.

\* \* \* \* \*